United States Patent Office

3,401,502
Patented Sept. 17, 1968

3,401,502
PROCESS AND APPARATUS FOR SCRUBBING GASES
Peter Hailer, Gauting, and Adolf Gunkelmann, Munich-Solln, Germany, assignors to Linde Aktiengesellschaft, Wiesbaden, Germany
Filed Nov. 1, 1966, Ser. No. 591,222
Claims priority, application Germany, Nov. 4, 1965, L 52,070
13 Claims. (Cl. 55—43)

ABSTRACT OF THE DISCLOSURE

A process and apparatus for scrubbing gases, utilizing a straight pipe having a length of about 20–50 times the diameter, gas velocities of about 0.1–0.8 velocity of sound, and employing a plurality of counter-current stages, wherein the mixture is withdrawn from the pipe, subjected to phase separation, and the resultant scrubbing liquid from the phase separator is regenerated before being used in the next stage.

---

This invention relates to gas absorption systems, in particular to processes and apparatus for the scrubbing of gases, and especially suitable for the removal of gaseous impurities from the main body of the gas.

In the conventional processes of this type, the gaseous mixture to be scrubbed is brought into intimate contact with the scrubbing liquid (i.e., the absorption medium) in a tower, and the components to be separated are absorbed in one or several stages by the scrubbing liquid. These towers are large-volume columns with packing, such as, for example, Raschig rings, or without packing as spray towers; or they are plate columns, there being employed mainly bubble caps and perforated plates.

Generally, the gas to be cleaned is under pressure, and when under high pressure, the scrubbing towers must be constructed accordingly, as pressurized vessels. In the latter case, because of the size involved, high-pressure towers represent a substantial percentage of the entire construction cost for any given high-pressure scrubbing system.

In many gas absorption processes, an exothermic heat of absorption (i.e., heat of solution) is evolved when components of a raw gas stream—be they impurities or the desired product—are absorbed by liquid absorption media. This heat of absorption, if not removed, increases the sensible heat of the process streams, particularly the absorption media, thereby decreasing the capacity of the absorption media to dissolve the desired gaseous component. In order to maintain a high loading capacity, it would be desirable, therefore, to cool the scrubbing liquid. This usually cannot be easily accomplished in conventional scrubbing towers, however, since for such a purpose, one, if not both media must either be passed several times through the container wall to the outside and again back into the tower, or suitable devices for this purpose must be provided within the tower. In both cases, substantial additional investment costs and direct operating costs are involved, particularly in the case of high pressure processes.

An object of this invention, therefore, is to provide improved absorption systems, particularly those that are suitable for high pressure operation.

Upon further study of the specification and claims, other objects and advantages of the present invention will become apparent.

For the attainment of the above objects, the raw gas is passed through several small-diameter mixing tubes, said tubes being charged continuously during this procedure with scrubbing liquid. In this connection, the gas velocity and the lengths of the mixing tubes are so selected that an intimate mixing of gaseous and liquid phases takes place. The desorbed gas is then separated from the loaded scrubbing liquid in separators immediately adjoining the mixing tubes.

Figure 1:
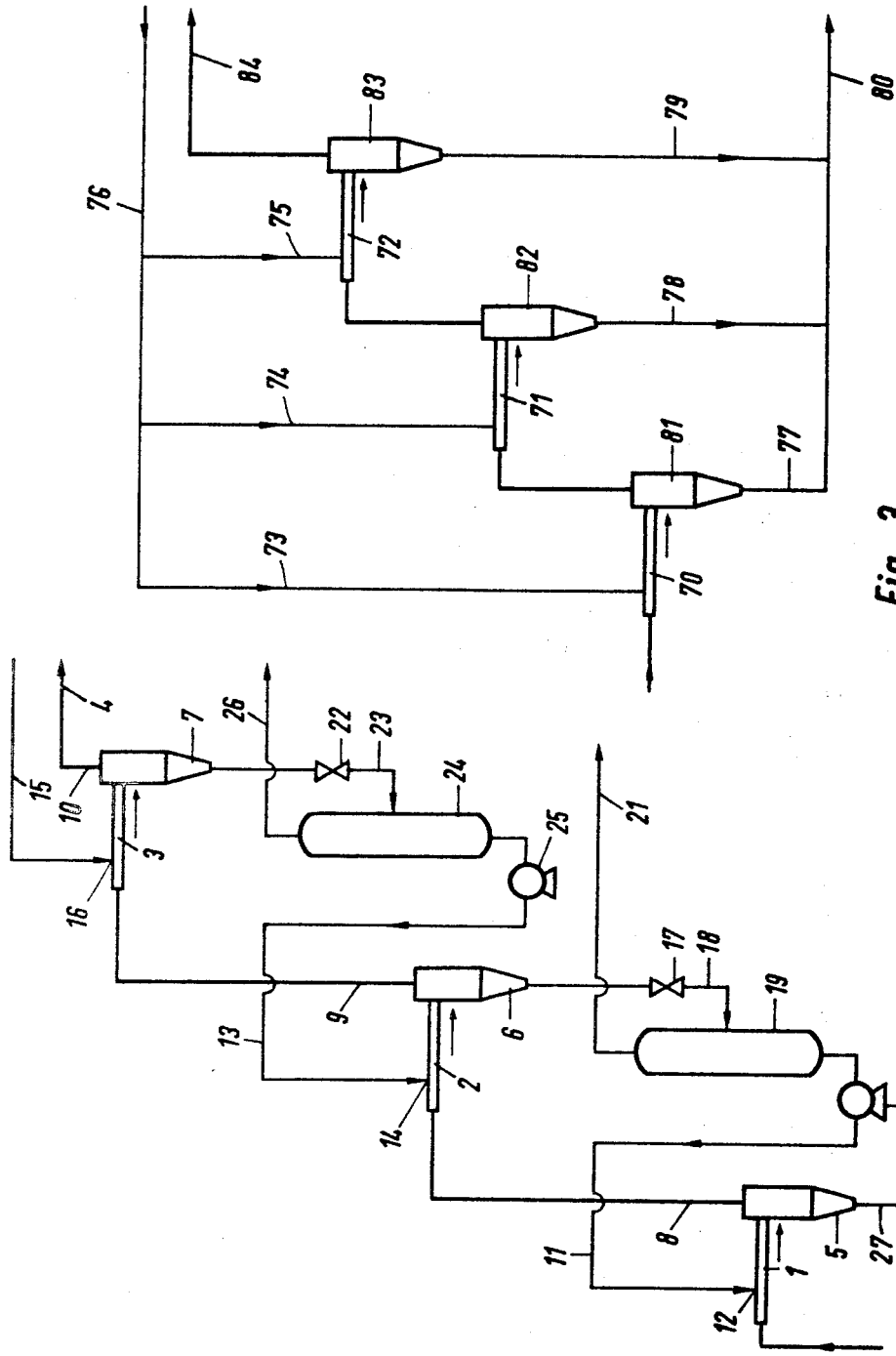
Figure 2:
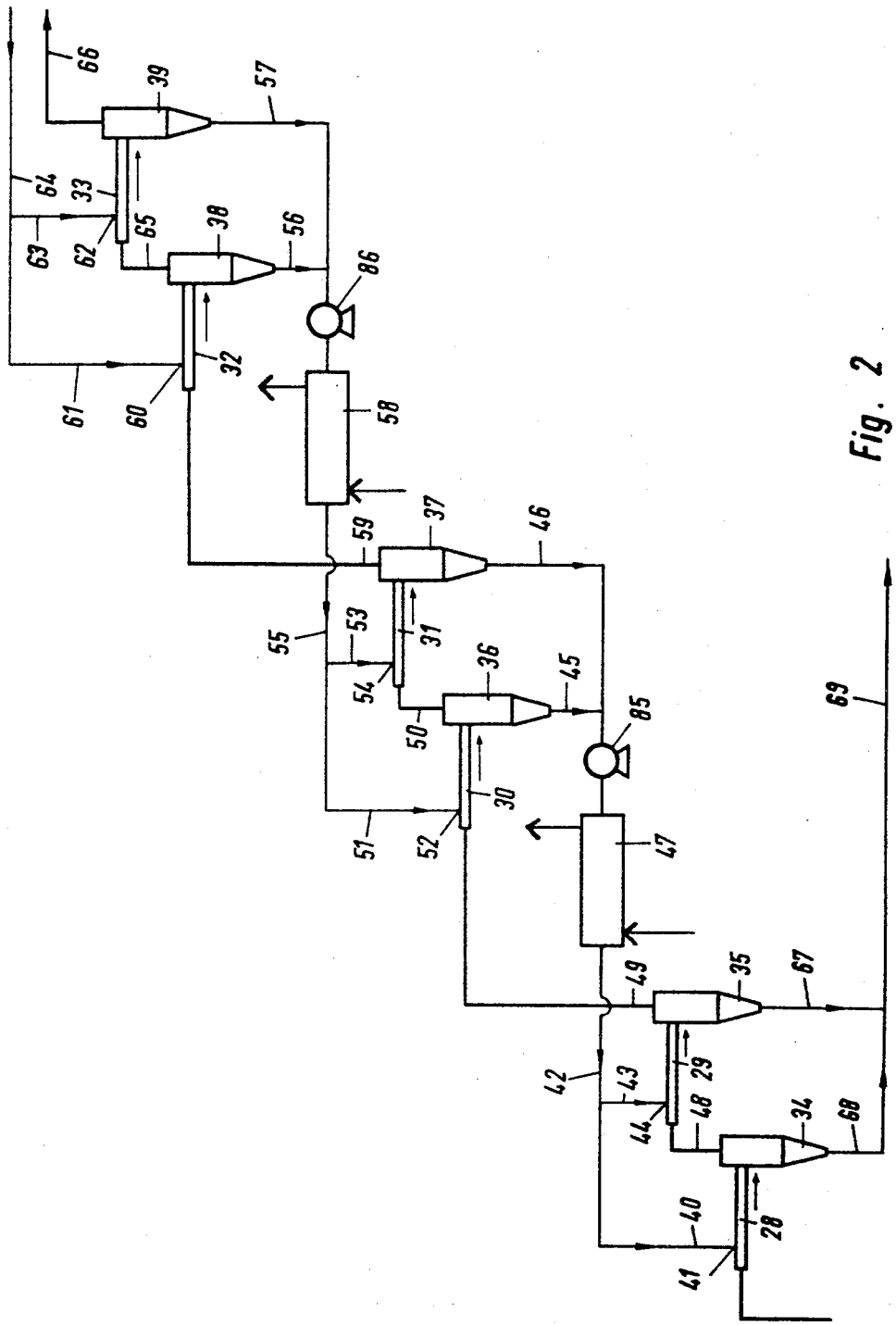

In the drawings:
FIGURE 1 is a schematic view of a countercurrent scrubbing plant having interposed regeneration;
FIGURE 2 is a schematic view of a combined countercurrent-cascade scrubbing plant with intermediate cooling; and
FIGURE 3 is a schematic view of a cascade scrubbing process.

The process of this invention is based on the discovery that the function of a plate in a scrubbing column can be taken over by a pipe of a far smaller diameter than the diameter of the column. The raw gas flows through this pipe or tube, and scrubbing medium is introduced, at some location along the pipe, into the gas stream. Since, at higher gas velocities, a turbulent intermixing of gas and liquid occurs in the scrubbing passage, a large mass transfer surface area is obtained within a relatively short pipe length.

The charging of the scrubbing agent into the pipe can be conducted without any of the usual auxiliary means, such as nozzles, distributor units, baffle plates, etc., because the intimate mixing is accomplished by the turbulence of flow within the pipe. When mixing the two phases, the gas components to be scrubbed out diffuse into the scrubbing liquid.

It is known that by the mere act of forcing a gas through a porous gas sparger into a liquid, a finite amount of mass transfer can be effected; and it is furthermore known that by utilizing an agitator, the degree of dispersion and mass transfer can be increased. According to Sherwood and Pigford, "Absorption and Extraction," 2nd edition, 1952, McGraw-Hill, N.Y., p. 277, such equipment usually operates batchwise and is limited to the equivalent of one theoretical plate because of the thorough mixing of the liquid.

In the present invention, it is apparent that the dimensions of the pipe in which mass transfer occurs can be varied considerably, depending on the scale of operations. Generally, though, the cross-sectional area of the pipe will be about 0.2 to 30%, preferably 0.3 to 20%, of the cross-sectional area of a packed tower.

(See Sherwood and Pigford, supra, for the design and performance of packed towers.)

The length of the scrubbing pipe is dimensioned to allow for a sufficient residence time under turbulent conditions to effect mass transfer, taking into account other variables, such as liquid and gas properties and velocities, inlet characteristics, eddy diffusivities, scale of turbulence (Sherwood and Pigford, supra, chapters II and III), etc. Generally speaking, the length is satisfactory when it is a multiple of 20 to 50, preferably 30 to 40, of the diameter of the pipe. The length of pipe is preferably disposed horizontally, although it is also possible for the pipe to be at an angle to the horizontal.

With respect to the superficial gas velocity that is employed in the scrubbing pipe, again the other variables must be taken into account. However, it is an unexpected development of this invention that very high gas velocities can be employed without requiring a very long length for the scrubbing pipe. Generally, satisfactory velocities are multiples of 0.1 to 0.8, preferably 0.3 to 0.6, of the velocity of sound.

The continuous phase in the scrubbing pipe is preferably the gas phase. The gas, however, may also be the discontinuous phase and the liquid may be the continuous phase, if desirable.

As for the separator which functions to separate denuded gas from loaded scrubbing liquid, it is preferred to employ a vertical cylindrical device, the dimensions of which are dependent on the characteristics of the substances being processed, their velocities and quantities. The outlet of the scrubbing pipe is preferably welded tangentially to the separator.

With respect to the optimization of any given system, some experimentation may be necessary despite the availability of several texts devoted to mass transfer, gas absorption, etc.

Because of the use of relatively small-diameter mixing pipes, this invention shows up to special advantage with scrubbing systems operated at above a pressure of 1.5, particularly above 15 atmospheres absolute. Systems, however, operating at relatively high pressures, such as about 200 atmospheres or more, using the inventive structure which will be further described below, will also show many advantages.

After the upgraded gas is separated from the loaded scrubbing liquid in a separator, then said gas can be passed to a subsequent scrubbing stage which can be of the same type as the first stage, whereby the degree of purity of the gas can be further increased. It has proven to be advantageous, in such a stepwise series connection of the scrubbing pipes and follow-up separators, to return the scrubbing liquid from the separator countercurrently to the direction of the gas flow, and to feed this scrubbing liquid to the preceding stage. In this connection, an intermediate cooling of the scrubbing liquid is possible and can be accomplished in a simple manner by the incorporation of a heat exchanger in the return conduit. According to a further embodiment of this invention, the desired intermediate cooling of the scrubbing liquid can also be effected by a throttling and an expansion step which can simultaneously be utilized for at least partially regenerating the scrubbing liquid.

In those cases wherein a sufficient amount of an inexpensive scrubbing medium is available, the plant investment costs can be further reduced by eliminating the countercurrent system with interposed regeneration and cooling of the scrubbing liquid, and replacing same with a cascade-type system. This mode of operation likewise provides for a series connection of scrubbing pipe-separators, but all scrubbing pipes are fed with scrubbing liquid via a common feed conduit, and the loaded scrubbing liquid withdrawn from the separators is fed to a common collecting conduit and passed to a regenerating stage. In contrast to a countercurrent system wherein pumps must be employed to compensate for the pressure loss between the individual stages, this is not necessary in the cascade process, since the conduits for the scrubbing liquid are connected to a common storage tank which can be arranged above the scrubbing pipes.

Whereas, in the novel process of this invention, the total pressure loss of the gas may be larger than in the conventional scrubbing columns of comparable efficiency, it is just in those cases wherein pressure loss is relatively unimportant that the process of the present invention can be most advantageously employed, namely in pressure scrubbing operations. Thus, at scrubbing pressures of about at least 1.5 atmospheres absolute, it is possible to do without the incorporation of additional compressors or gas pumps, since the entrance pressure of the raw gas is high enough to overcome the various losses in pressure.

A further advantageous embodiment of this invention is directed to a combination of countercurrent and cascade systems. In this mode of operation, the gas scrubbing operation is likewise conducted in several, series-connected scrubbing pipes with separators connected thereafter. In this connection, the loaded scrubbing liquid is collected by scrubbing stages, at least two of which are respectively connected one after the other, and is recycled to the same number of preceding stages. However, it is also possible to return and regenerate the loaded streams of scrubbing liquid only partially. In this manner, just as when employing the countercurrent principle by itself, it is possible to attain a particularly favorable loading and utilization of the scrubbing liquid. This is of great advantage particularly when the quantity of scrubbing liquid is limited, or when it is relatively expensive.

The process of the present invention not only results in a considerable savings in plant investment costs, owing to the replacement of large-volume pressure vessels with pipelines and interposed separators of a comparatively very small diameter, but it also offers ready access to the process streams of gas and scrubbing liquid because they are conveyed in relatively thin pipelines. Thereby, such process streams can be isolated and treated by desired physical process steps.

Referring now to the drawings, in the system illustrated in FIGURE 1, raw gas under pressure is fed to the scrubbing pipe 1 and is charged at 12 with a scrubbing liquid flowing through line 11. The scrubbing path in the scrubbing pipe is sufficiently long to obtain a good distribution of the liquid on its way through the pipe. This distribution can, if desired, be improved by the incorporation of baffle plates in the pipe. The scrubbing liquid is separated, with the absorbed gas components, from the gas stream in the centrifugal separator 5 joining the scrubbing passage and is conducted, via conduit 27, to a regenerating device, the latter not being illustrated.

The gas stream exiting from the liquid separator 5 through the pipe 8 is fed to a second scrubbing stage which is identically constructed as the first scrubbing stage. The partially purified raw gas stream is again charged with scrubbing liquid into the scrubbing pipe 2, at point 14, via the conduit 13 for the scrubbing liquid. This scrubbing medium collects, together with the absorbed gaseous components, in the separator 6. The loaded scrubbing liquid, warmed by the exothermic heat of absorption, flows via an expansion valve 17 through the conduit 18 to a regenerating device 19. On expansion, a large portion of the gaseous components absorbed in scrubbing pipes 1 and 2 evaporates, under simultaneous cooling of the scrubbing liquid, and escapes from the regenerating device (phase separator) 19 through conduit 21. The scrubbing medium, cooled and cleansed in this manner, is then brought to the pressure ambient in line 11, by a pump 20, and recycled to the first scrubbing stage through conduit 11.

The gas escaping at 9 from the second scrubbing stage is brought to the desired degree of purity in a subsequent third stage; for this purpose, this gas is mixed, in the above-described manner, in the scrubbing pipe 3 of this stage with scrubbing medium fed via line 15 and introduced at 16. The loaded scrubbing liquid collected in the separator 7 is subjected to a cooling and regenerating process in the second scrubbing stage. Thus, the scrubbing liquid is expanded in the expansion valve 22 to such an extent that the impurities evaporate, and escape via conduit 26 from the regenerating device 24. In this connection, the heat required for vaporization of the gaseous impurities is obtained from the scrubbing liquid, thereby cooling the latter; the cooled regenerated liquid is again brought to the pressure ambient in the second scrubbing stage, by means of the pump 25 incorporated in the recycle line 13, and is fed to this second stage. The scrubbed gas is withdrawn via the riser 10 from the separator 7, and is passed through the pipeline 4 as scrubbed gas of the desired purity.

In the system schematically illustrated in FIGURE 2, the scrubbing process is conducted in six stages, and two series-connected stages form a unit with respect to the charging of scrubbing liquid. An intermediate regeneration of the scrubbing liquid is not provided, and the required removal of the absorption heat is carried out in interposed heat exchangers.

The raw gas entering the plant, which gas is under an initial pressure, is scrubbed in the scrubbing pipe 28 by scrubbing liquid fed via conduit 40 and introduced at 41. In the separator 34, the gas is again separated from the loaded scrubbing liquid, the latter being conducted to a regenerating device via conduits 68 and 69. The partially purified raw gas flows through the riser 48 into the scrubbing pipe 29 of the second scrubbing stage, this scrubbing pipe 29 being connected at 44 to the feed line 43 of the scrubbing medium. The conduit 43 is in communication with the same manifold conduit 42 as the scrubbing medium conduit 40 of the first stage. After being separated from the loaded scrubbing liquid in the separator 35, said liquid being withdrawn through conduit 67, the raw gas rises through the conduit 49 into the scrubbing pipe 30 constituting the scrubbing system of the third stage. Into this scrubbing pipe 30, the required amount of scrubbing medium is again introduced at 52 through conduit 51, and this scrubbing medium is separated in the separator 36, together with the absorbed gaseous components, from the main gas stream.

The resultant main gas stream flows via the riser 50 to the scrubbing pipe 31 of the fourth scrubbing stage. After the gaseous components to be scrubbed out have been absorbed, the scrubbing liquid introduced at 54 through conduit 53 is again separated in the separator 37 from the cleansed gas stream. The cleansed gas stream is then fed, via the riser 59, to the scrubbing pipe 32 of the fifth scrubbing stage. The loaded scrubbing liquid flowing out of the separators 36 and 37 of the third and fourth stages is fed, via conduits 45 and 46, to the pump 85. This pump forces the scrubbing liquid through a heat exchanger 47 wherein, with the aid of a cooling medium of an appropriate temperature, the heat of absorption built up in the scrubbing liquid is removed. The characteristics of pump 85 include the capacity to overcome the pressure difference between the two stages 3 and 4 and the stages 1 and 2. The scrubbing medium cooled in this manner is passed counter-currently to the first and second scrubbing stages 28 and 29 for further absorption.

The gas scrubbed in the scrubbing pipe 32 and thus having a greater degree of purity is fed, after the scrubbing liquid has been separated in the separator 38, via the riser 65, to the mixing pipe 33 of the sixth and last stage of this scrubbing plant. The scrubbing liquid is charged, in the fifth stage and the sixth stage, at 60 and 62, respectively, via the conduits 61 and 63, respectively, the conduits branching off a common conduit through which the plant is continuously supplied with pure scrubbing medium. The loaded scrubbing medium leaving the liquid separators 38 and 39 via the conduits 56 and 57 is first fed, with the streams of conduits 56 and 57 being combined, to the heat exchanger 58, by the pump 86. In this heat exchanger, the scrubbing liquid is cooled. Then, the scrubbing liquid is conducted countercurrently to the scrubbing passages of the third and fourth stages and fed to the corresponding scrubbing pipes of these stages. The scrubbed gas leaves the plant via the pipeline 66.

In the system illustrated in FIGURE 3, the scrubbing medium is fed by cascade flow. The pure scrubbing medium introduced into the plant is withdrawn from a common distributor line 76 and fed, via branch conduits 73, 74, 75 to the scrubbing pipes 70, 71, 72 of the three scrubbing stages of this plant. After the gas scrubbing operation, the liquid phase is separated from the gaseous phase in the separators 81, 82, 83, the loaded scrubbing liquid exiting continuously through the pipelines 77, 78, 79 from the separators and being withdrawn via the collector line 80. The gas having the desired degree of purity leaves the plant via pipeline 84. In this system, the intermediate regeneration and/or cooling of the scrubbing liquid is omitted since a sufficient quantity of fresh scrubbing liquid is available for each stage.

The preceding examples can be repeated with similar success by substituting the generically and specifically described reactants and operating conditions of this invention for those used in the preceding examples.

From the foregoing description, one skilled in the art can easily ascertain the essential characteristics of this invention, and without departing from the spirit and scope thereof, can make various changes and modifications of the invention to adapt it to various usages and conditions. Consequently, such changes and modifications are properly, equitably, and intended to be, within the full range of equivalence of the following claims.

What is claimed is:

1. A process for scrubbing gases comprising passing gas to be scrubbed at a velocity of 0.1–0.8 the speed of sound through a plurality of scrubbing pipes of a small diameter as compared to a functionally equivalent packed column, each scrubbing pipe having a length 20–50 times the diameter of the pipe; passing scrubbing liquid into said scrubbing pipes concurrent with gas flowing therein; effecting mass transfer between said gas-to-be-scrubbed and said liquid; passing each resultant mixture of scrubbed gas and loaded scrubbing liquid to each of a plurality of gas-liquid separators to effect separations of said scrubbed gas and loaded scrubbing liquid and passing scrubbed gas in stepwise progression from the separator of each $n$th scrubbing pipe to the $(n+1)$th scrubbing pipe.

2. A process as defined by claim 1, characterized in that the scrubbing liquid is withdrawn from the separator of each $n$th stage, is conducted countercurrently to the direction of the gas stream, and is fed into the gas stream of the mixing pipe of the $(n-1)$th stage.

3. A process as defined by claim 2, characterized in that the loaded scrubbing liquid conducted countercurrently to the direction of the gas stream is expanded in an expansion device before being introduced into the gas stream of the scrubbing pipes, to evaporate gaseous components absorbed by the scrubbing liquid, and to cool said scrubbing liquid.

4. A process as defined by claim 1, characterized in that the scrubbing liquid is withdrawn from the separators of a plurality of serially connected scrubbing stages; is conducted, in a common conduit, countercurrently to the direction of the gas stream; and is fed into the gas streams of the same number of scrubbing pipes, as compared to the number of serially connected scrubbing stages, of a plurality of downstream stages preceding with regard to gas flow.

5. A process as defined by claim 4, characterized in that the loaded scrubbing liquid conducted countercurrently to the direction of the gas stream is expanded in an expansion device before being introduced into the gas stream of the scrubbing pipes, to evaporate gaseous components absorbed by the scrubbing liquid, and to cool said scrubbing liquid.

6. A process as defined by claim 5 wherein the gas-to-be-scrubbed is the continuous phase; the process is conducted at a pressure of at least about 200 atmospheres; the gas velocity is 0.3–0.6 of the velocity of sound, and said scrubbing pipes are straight and horizontal.

7. A process as defined by claim 1 wherein said gas-to-be-scrubbed is the continuous phase.

8. A process as defined by claim 7 wherein the gas velocity is 0.3–0.6 the velocity of sound.

9. A process as defined by claim 1 wherein the process is conducted at a pressure of at least about 200 atmospheres.

10. A process as defined by claim 1 wherein the gas velocity is 0.3–0.6 the velocity of sound.

11. A process as defined by claim 1 wherein said scrubbing pipes are straight and horizontal.

12. A process for scrubbing gases comprising mixing a scrubbing liquid with gas-to-be-scrubbed under high pressure through several scrubbing pipes of small diameter, the velocity of the gas, diameter of the scrubbing pipes and length of the scrubbing pipes being such that a turbulent intermixing of gas and liquid is effected; separating the resultant scrubbed gas from the charged scrubbing liquid in an individual separator immediately adjacent and forming a stage with each of said scrubbing pipes; and continuously increasing the pressure of the scrubbing medium as it passes countercurrently to the gas flow from one individual scrubbing stage to the next.

13. Gas scrubbing apparatus, comprising several series-connected scrubbing pipes for receiving and discharging gas and scrubbing liquid; gas-liquid separators having inlet means, gas outlet and liquid outlet means, said inlet means being connected to the discharge ends of said scrubbing pipes, conduit means connecting the gas outlet means of said gas-liquid separators with the receiving sides of the following scrubbing pipes; and regenerating means for liberating gaseous impurities, and conduit means connecting said regenerating means from the liquid outlet of a separator with the scrubbing liquid receiving end of scrubbing pipe connected to a different separator, said regenerating means comprising serially connected expansion valve, phase separator, and pump.

References Cited

UNITED STATES PATENTS

| | | | |
|---|---|---|---|
| 1,079,541 | 11/1913 | Collett | 55—30 |
| 1,216,059 | 2/1917 | Bosch | 55—93 X |
| 3,152,194 | 10/1964 | Pohl et al. | 55—64 X |
| 3,232,027 | 1/1966 | Lorenz et al. | 55—93 X |

REUBEN FRIEDMAN, *Primary Examiner.*

R. W. BURKS, *Assistant Examiner.*